Feb. 18, 1964 — P. J. REED — 3,121,348
TORQUE ROD
Filed Nov. 28, 1961 — 4 Sheets-Sheet 1
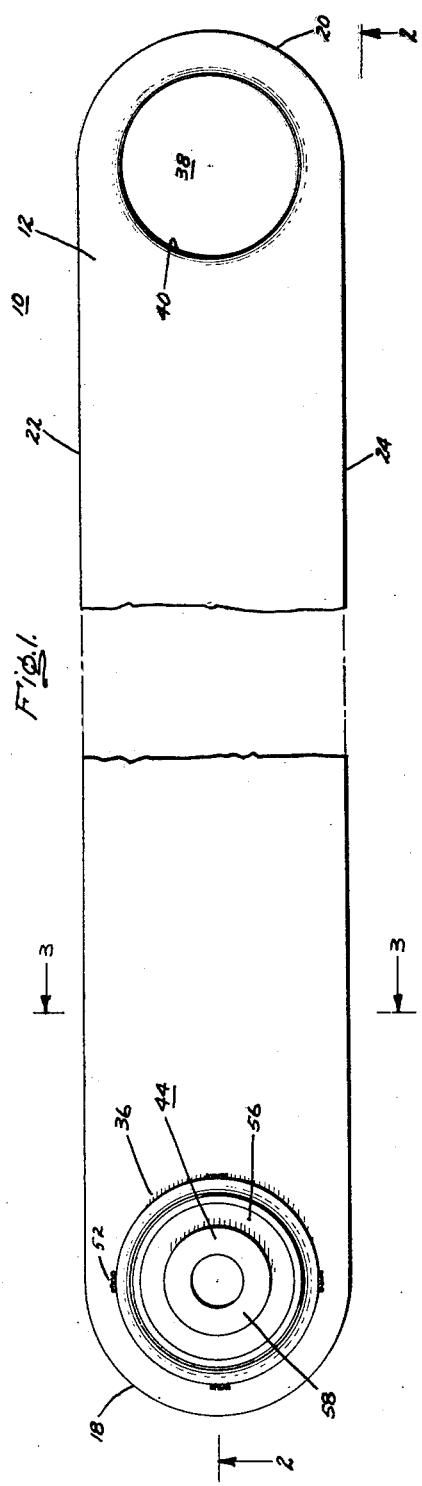
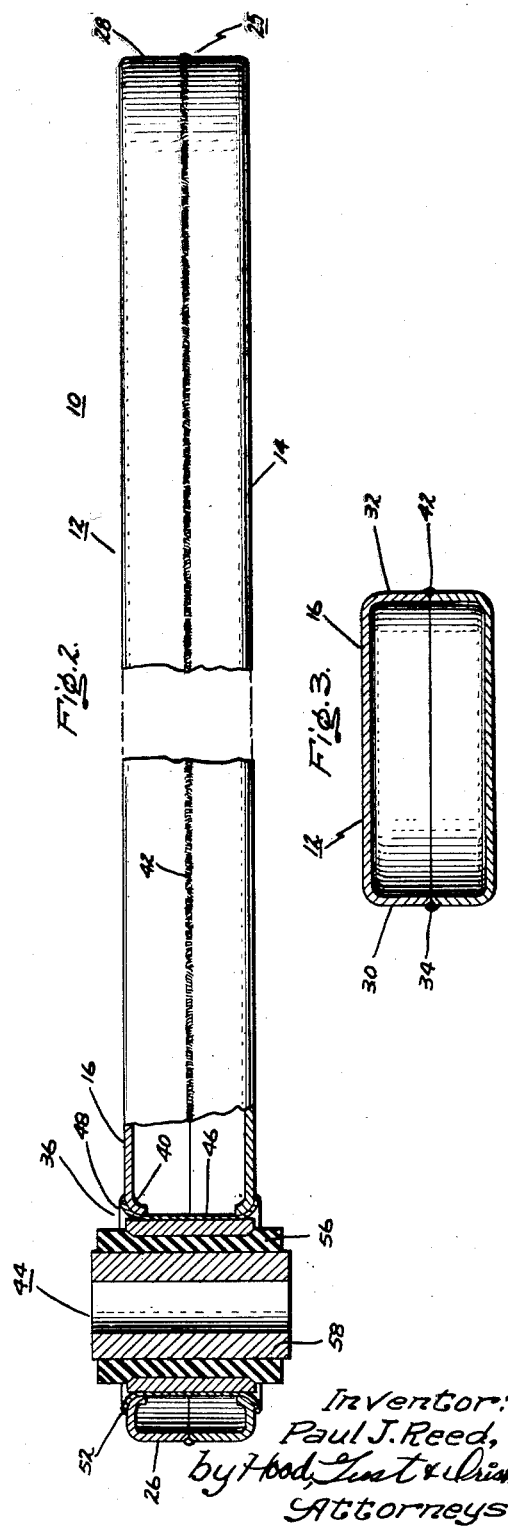
Inventor:
Paul J. Reed,
by Hood, Gust & Irish
Attorneys.

Feb. 18, 1964 P. J. REED 3,121,348
TORQUE ROD
Filed Nov. 28, 1961 4 Sheets-Sheet 2
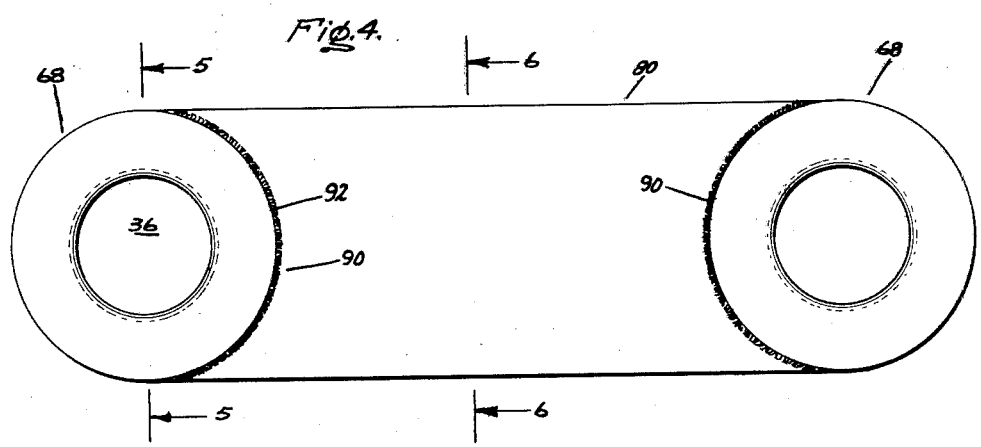
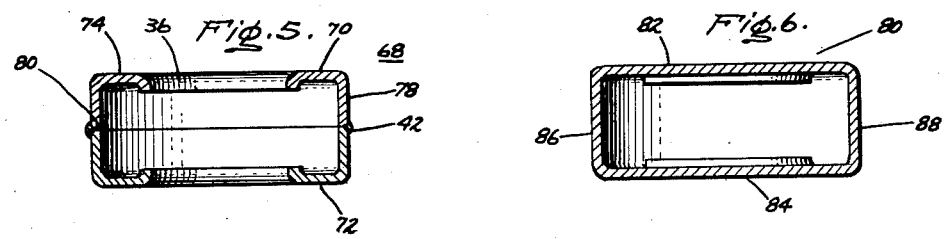
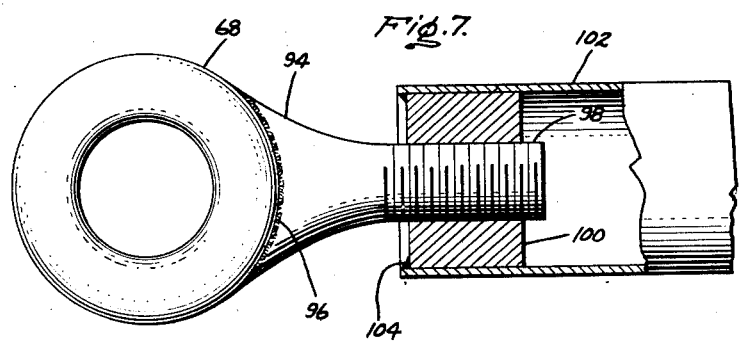
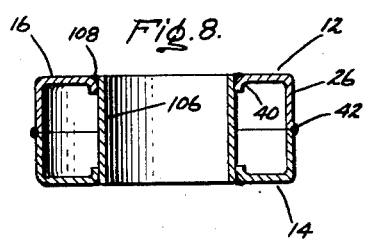
Inventor:
Paul J. Reed,
by Hood, Gust & Irish
Attorneys.

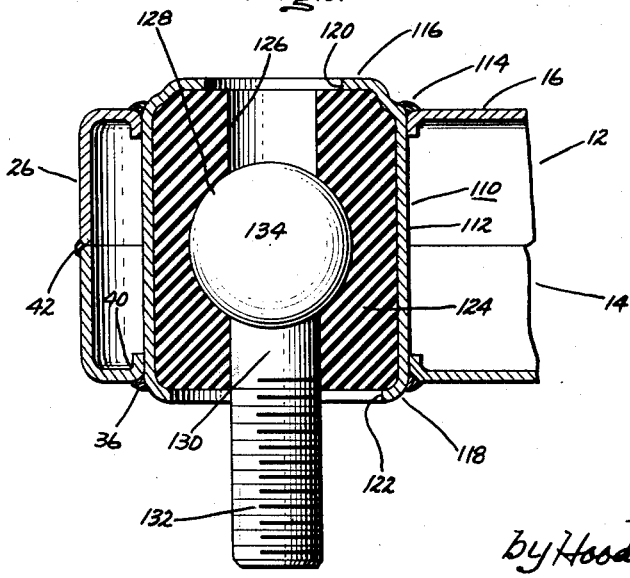

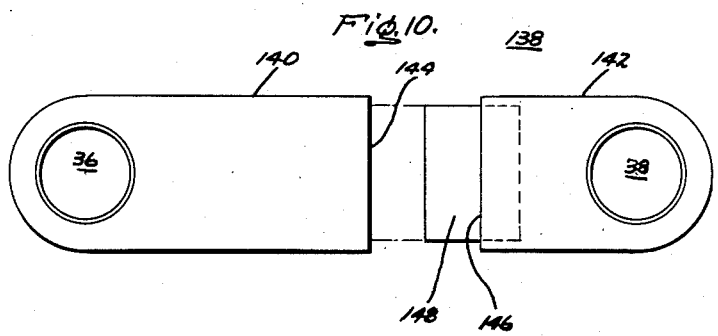
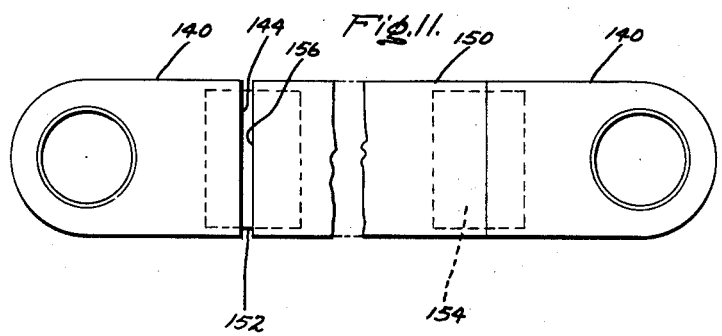

3,121,348
TORQUE ROD
Paul J. Reed, 19 E. Main St., Wabash, Ind.
Filed Nov. 28, 1961, Ser. No. 155,260
14 Claims. (Cl. 74—588)

This invention relates generally to torque rods of the type employed in automotive vehicles.

Torque rods are commonly employed in trucks and trailers having dual or tandem rear axles, and also in four-wheel drive vehicles, extending between the frame of the vehicle and the axle or axles for stabilizing the action of the frame with reference thereto. In the past, such torque rods conventionally have been formed of an elongated steel rod either cast or having a tubular cross-section and having the ends machined to accommodate suitable bushings and bearing assemblies for attachment to the frame and axle assemblies respectively. Such prior torque rods have added appreciably to the overall weight of the vehicle and the requisite machining to close tolerances has involved considerable production time and thus expense. It is therefore desirable to provide an improved torque rod construction particularly suitable for vehicles which is substantially lighter than prior torque rod constructions, requires no machining, but which nevertheless provides the requisite strength.

It is accordingly an object of my invention to provide an improved torque rod assembly.

Another object of my invention is to provide a fabricated torque rod assembly in which no machining is required.

A further object of my invention is to provide an improved bearing assembly for a torque rod.

Further objects and advantages of my invention will become apparent by reference to the following description and the accompanying drawing, and the features of novelty which characterize my invention will be pointed out with particularity in the claims annexed to and forming a part of this specification.

My invention in its broader aspects provides a torque rod assembly fabricated from two identical, deep drawn formed metal stampings which are welded together to form a rod body. The two mating stampings have openings formed therein which accommodate bushings which in turn accommodate the necessary bearings. The assembly of my improved torque rod is therefore entirely mechanical with no machining being required and the resulting rod is thus substantially lighter in weight and more economical to produce than prior rods but nevertheless provides the necessary strength.

In the drawings:

FIG. 1 is a top view of one embodiment of my invention;

FIG. 2 is a side view, partly in cross-section, taken along the line 2—2 of FIG. 1;

FIG. 3 is a cross-sectional view taken along the line 3—3 of FIG. 1;

FIG. 4 is a top view of another embodiment of my invention;

FIG. 5 is a cross-sectional view taken along the line 5—5 of FIG. 4;

FIG. 6 is a cross-sectional view taken along the line 6—6 of FIG. 4;

FIG. 7 is a fragmentary view, partly in cross-section, illustrating another embodiment of my invention;

FIG. 8 is a cross-sectional view illustrating a modified form of my invention;

FIG. 9 is a fragmentary cross-sectional view illustrating yet another embodiment of my invention;

FIG. 10 is an exploded side view illustrating a further embodiment of my invention;

FIG. 11 is a side view illustrating a modification of the embodiment of FIG. 10; and FIG. 12 illustrates the steps employed in forming the two identical sheet metal stampings which are employed in the fabrication of the torque rods of my invention.

Referring now to FIGS. 1, 2 and 3 of the drawings, the improved torque rod of my invention, generally indicated at 10, is formed of two identical, deep drawn, formed metal stampings 12 and 14. Members 12 and 14 are formed of suitable sheet metal such as heat treated aluminum or steel, No. 8 to 11 gauge 1345 S.A.E. 1010 steel having been found to be satisfactory.

Each of the elongated stampings 12, 14 has a substantially flat surface 16, rounded ends 18 and 20 which respectively define 180° of a circle, and spaced parallel straight sides 22 and 24 respectively joined to the rounded ends 18, 20 tangent thereto as shown in FIG. 1. A deep drawn continuous flange 25 depends from the perimeter of surface 16 of each of the stampings 12, 14 with end portions 26, 28 depending from rounded ends 18, 20 and side portions 30, 32 depending from sides 22, 24, respectively. The flange 25 of each of the stampings 12, 14 has a continuous edge 34 which is parallel with the flat surface 16.

Each of the flat surfaces 16 of the stampings 12, 14 has two circular openings 36, 38 formed therein adjacent ends 18, 20 respectively and concentric therewith. Openings 36, 38 are respectively defined by inner shoulders or flanges 40 which depend from the flat surfaces 16. As seen in FIG. 2, the flanges 40 are substantially shorter than the continuous flange 25.

The two stampings 12, 14 are assembled with the edges 34 of flanges 25 abutting and are then welded together with a continuous weld 42, as shown. Reference to FIG. 3 will now reveal that when assembled, the two stampings 12, 14 form an elongated body of rectangular cross-section formed of metal of uniform thickness with the top and bottom surfaces in spaced parallel relation and with the openings 36, 38 respectively in transverse alignment.

A bearing assembly 44 is seated in each of the openings 36, 38; for purposes of clarity, the assembly 44 is shown seated in only opening 36 in FIGS. 1 and 2, it being understood that an identical bearing assembly will be provided in opening 38. Bearing assembly 44 comprises a sleeve or housing member 46 formed of relatively thin metal inserted in the openings 36 and extending therebetween, the ends 48 and 50 in the illustrated embodiment being flared to conform to and engage the flanges 40. Sleeve 46 can be initially formed as a welded tube, a section of seamless tubing, or a deep drawn stamping. One of the flared ends 48, 50 may be initially formed, the sleeve 46 then inserted in openings 36 and the other end then flared with a suitable tool. The ends 48, 50 of sleeve 46 are preferably tack-welded to the respective flat surface 16 at four equally spaced points, as at 52.

A bushing formed of suitable metal is press-fitted within sleeve 46 and it will be seen that the sleeve 46 provides a continuous bearing surface or seat for the bushing 54 and also some degree of spring action to accommodate distortion during press-fitting of the bushing 54 therein. Metal bushing 54 supports a bushing 56 formed of suitable resilient material, such as rubber, which in turn supports an inner bearing sleeve 58.

Referring briefly to FIG. 12 in which the steps of forming the stampings 12, 14 are illustrated, a sheet of suitable metal is first blanked to form blank 60 as shown in FIG. 10A, following which in another blanking operation rounded ends 62 are blanked and openings 64 pierced, as shown in FIG. 10B. The perimetral flange 25 is then formed in a deep drawing operation, as shown in FIG.

10C, and finally the inner shoulder or flange 40 is formed surrounding opening 64 in another drawing operation. The two thus formed halves are then assembled together as above described, sleeves 46 are inserted in openings 36, 38 in order to provide proper alignment of halves 12, 14 and the weld 42 is then formed.

It will now be readily seen that the box-like construction of uniform width and thickness provides a fabricated torque rod capable of carrying high stresses of torque, tension and compression, no machining being necessary in the manufacture of the rod. The shoulders or flanges 40 defining the openings 36, 38 provide a reinforcement at each end of the rod where the stresses are highest and also forms a rigid seat on each side of the rod for press-fitting the sleeve or housing 46 into which the remaining components of bearing assembly 44 are in turn press-fitted. It will further be seen that the inner flanges 40, being of uniform thickness, distribute equal stresses when the bushing 54 with the bushing 56 and bearing 58 assembled therein is press-fitted into the sleeve 46. The inner flanges 40 distribute equal stresses through the 180° radius at each end of the rod in contrast with prior constructions in which stress failures resulted at the ends of torque rods which are not of uniform thickness nor uniform in shape.

The mechanical assembly of the two halves 12, 14 and the two bearing assemblies 44 provide inexpensive and rapid production assembly and a resulting stress-free torque rod in which the requisite close tolerances are not distorted either by the welding of the two halves together or the tack-welding of the ends of the sleeves 46. The final welding of the perimeters of the two halves permits the entire unit to expand and contract uniformly, thereby assuring finished production tolerances and fits in a stress-free fabricated torque rod assembly.

Referring now to FIGS. 4, 5 and 6, in which like elements are indicated by like reference numerals, an embodiment of my invention is shown which does not require multiple dies to provide torque rods of different lengths having different center distances. Here, a pair of bearing members 68 are provided, each formed of two identical deep-drawn stampings 70 and 72. Each of the identical halves 70, 72 has a flat cylindrical surface 74 with a deep-drawn continuous 360° flange depending from its perimeter and having its edge 80 parallel with surface 74. Opening 36 is formed in the surface 74 concentric with flange 78 and inner flanges or shoulders 40 depend from the flat surface 74 to define opening 36, the flanges 40 again being substantially shorter than the outer flange 78. The two halves 70, 72 are again arranged with the edges 80 of their flanges 78 in abutting relationship and are welded together as at 42. As in the case of the embodiments of FIGS. 1–3 inclusive, a sleeve 46 may be inserted in the openings 36 of the two halves 70, 72 prior to welding in order to insure alignment.

A section of elongated rectangular tubing 80 of uniform wall thickness having flat top and bottom surfaces 82 and 84 and flat side walls 86 and 88 is provided, the surfaces 82 and 84 being respectively flush with the surfaces 74 of the assembled bearing members 68 and the surfaces 86, 88 being transversely spaced apart by the same distance as the outside diameter of the bearing member 68. Arcuate cutouts 90 are respectively formed in the top and bottom surfaces 82 and 84 of the tubular member 80, these cutouts having the same radius as the outer surfaces of flanges 78 of the bearing member 68. The assembled bearing members 68 are then seated in the arcuate portions 90, as shown in FIG. 4, and welded thereto as at 92 with the top and bottom surfaces 82, 84 of the tubular member 80 being respectively flush with the surfaces 74 of the two halves 70, 72 of the bearing member 68 and with the side surfaces 86, 88 being respectively tangent with the flanges 78. It will be readily seen that with this arrangement, the tubular member 80 may be cut to fit any desired center distance between the openings 36 of the bearing member 68. It will further be seen that the bearing members 68 are formed of identical halves 70, 72 which are welded together through a full 360°, thus providing additional strength and more rapid fabrication and welding. Two halves 70 and 72 may be formed in the manner described above and shown in FIG. 12. It will be readily understood that bearing assemblies, such as the bearing assembly 44 shown in FIGS. 1–3 inclusive, may be assembled in the openings 36.

Referring now to FIG. 7 in which like elements are still indicated by like reference numerals, in instances where adjustment of the center distances are required to fit individual installations, the flanges 78 of the assembled bearing member 68 may be welded to a cast steel stud member 94, as at 96, stud 94 extending radially outwardly from the bearing member 68 with its axis in the same plane as the weld 42 which connects the two halves 70, 72. Stud 94 has its end 98 suitably threaded and engaged by a threaded plug member 100 welded in the end of a suitable elongated tubular member 102, as at 104. In the embodiment of FIG. 7, the outside diameter and also the wall thickness of tubing 102 may be varied to accommodate varying loads.

Referring now briefly to FIG. 8 in which the same reference numerals are employed as in FIGS. 1–3 inclusive, the center sleeve or bearing housing member 106 may take the form of a straight section of tubing having its ends tack-welded to surfaces 16, as at 108, and flush therewith, rather than having its ends rolled or formed as shown in FIG. 2. A suitable bearing assembly such as bearing assembly 44 of FIG. 2 is then press-fitted into the sleeve 106. It will be readily understood that in some instances the provision of bearing housing or sleeve 46 or 106 may not be needed and a bearing assembly may be press-fitted directly into openings 36 being supported by the inner flanges or shoulders 40.

Referring now to FIG. 9, in which like elements are still indicated by like reference numerals, the improved torque rod assembly of my invention is adaptable for use with side-mounted swivel joints. Here, a housing member 110 formed of relatively thin sheet metal and having a cylindrical body portion 112 is press-fitted in the openings 36 prior to welding of the two halves 12, 14 together, thus as in the case of the previous embodiments, holding the two halves in alignment for formation of the weld 42. The housing 110 is then tack-welded to surfaces 16, as at 114. Housing 112 has radially inwardly extending flange portions 116 and 118 respectively defining cylindrical openings 120 and 122 coaxial with the openings 36. It will be observed that the flange 116 defines an opening 120 smaller in diameter than the opening 122 defined by flange 118. A bearing member 124 formed of suitable resilient material, such as rubber, is retained within the housing 112 by the flanges 116, 118. Bearing member 124 has a coaxial opening 126 formed therethrough, opening 126 in turn having an enlarged spherical surface 128 formed therein intermediate its ends. A stud 130 having a threaded end 132 extends through opening 122 and opening 126 in the bearing member 124 and has a ball 134 formed on its other end which is rotatably seated in the spherical surface 128 of the bearing member 124, thus forming therewith a ball and socket joint.

Referring now to FIG. 10 in which like elements are indicated by the same reference numerals as in FIGS. 1, 2 and 3, there is shown another arrangement for providing adjustable center distances. Here, the torque rod 138 is formed of two sections 140 and 142 each fabricated of two stampings which are welded together in the manner described above in connection with FIGS. 1, 2 and 3, and 12; section 140 contains opening 36 and section 142 contains opening 38. Sections 140 and 142 respectively have open ends 144 and 146 and a rectangular tubular sleeve member 148 is telescoped partially within open end 146 of section 142 and welded in place. The end of sleeve 148 which extends beyond end 146 of section 142 may then be telescoped within end 144 of section 140 by an amount sufficient to provide the proper center distance between bearing openings 36, 38 and then welded.

Referring now to FIG. 11, an arrangement is shown having even greater flexibility than that of FIG. 10. Here, two identical end sections 140 are provided, each again fabricated and assembled in the manner described in connection with FIGS. 1, 2 and 3, and 12. A center section 150 of rectangular tubing is provided having tubular sleeve members 152 and 154 respectively telescoped in its open ends and welded in place. The sleeve members 152 and 154 are then respectively telescoped into the open ends of section 140 and welded in place to provide the requisite center distance between the openings 36, 38. Here, only one set of dies is required to form the identical stampings of sections 140. The center section 150 can be cut to approximate length from suitable seamless or welded tubing with the exact center distance being provided during welding of sleeves 152 and 154 to ends 140. Here, end 144 of the left-hand section 140 and end 156 of the sleeve 150 are shown slightly spaced while the adjacent ends of the right-hand section 140 and sleeve 150 are shown abutting, thus illustrating the method of adjustment to obtain the desired center distance exactly.

It will now be readily apparent that I have provided a mechanically assembled, fabricated, stress-free torque rod assembly which provides close tolerances and accommodates high tension, torque and compressive stresses, but which is of substantially lighter weight than prior torque rod assemblies and which requires no machining, thereby providing a device which can be readily assembled by unskilled labor at a substantial savings in overall cost.

While I have illustrated and described specific embodiments of my invention, further modifications and improvements will occur to those skilled in the art and I desire therefore in the appended claims to cover all modifications which do not depart from the spirit and scope of my invention.

What is claimed is:

1. A fabricated torque rod comprising: two rod assemblies, each of said rod assemblies comprising two identical members respectively formed of relatively thin sheet metal; each of said members having a flat surface with a circular opening formed therein, a rounded end coaxial with said opening, straight parallel sides respectively tangent with said rounded end, and an opposite end, said flat surface having a flange depending from said sides and rounded end having an edge parallel with said flat surface; said edges of said flanges of said two members being welded together in abutting relationship with said flat surfaces in spaced parallel relationship and said openings respectively in alignment, said flanges and flat surfaces at said opposite end thereof defining a tubular cross-section having an open end; and a member telescoped partially within said open end of one of said assemblies and secured thereto with a portion projecting therefrom, said projecting portion being telescoped within the open end of the other of said assemblies and secured thereto.

2. A fabricated torque rod comprising: two rod assemblies, each of said rod assemblies comprising two identical members respectively formed of relatively thin sheet metal; each of said members having a flat surface with a circular opening formed therein, a first end adjacent to said opening, said flat surface having straight parallel sides and a flange depending from said sides and end, said flange having an edge parallel with said flat surface, a second opposite end; said edges of said flanges of said two members being welded together in abutting relationship with said flat surfaces in spaced parallel relationship and said openings respectively in alignment, said flanges and flat surfaces at said opposite end thereof defining a tubular cross-section having an open end; and a member telescoped partially within said open end of one of said assemblies and secured thereto with a portion projecting therefrom, said projecting portion being telescoped within the open end of the other of said assemblies and secured thereto.

3. A fabricated element for a torque rod comprising two identical members respectively formed of relatively thin sheet metal, each of said members having a flat surface with a circular opening formed therein, said surface having a flange depending from its perimeter, said flange having at least a portion coaxial with said opening throughout at least 180°, the edges of said flanges of said two members being welded together in abutting relationship with said surfaces in spaced parallel relationship and said openings in alignment, each of said flanges having two spaced parallel straight portions respectively joined to the ends of the first-named portion and tangent thereto.

4. A fabricated element for a torque rod comprising two identical members respectively formed of relatively thin sheet metal, each of said members having a flat surface with a circular opening formed therein, said surface having a flange depending from its perimeter, said flange having at least a portion coaxial with said opening throughout at least 180°, the edges of said flanges of said two members being welded together in abutting relationship with said surfaces in spaced parallel relationship and said openings in alignment, a metal sleeve member seated in said openings extending between said surfaces and respectively welded thereto, said metal sleeve member having radially inwardly extending flange portions respectively formed at its ends and respectively defining openings coaxial with said metal sleeve member, a stud member extending through one of said last-named openings and having a ball formed on one end thereof and positioned within said metal sleeve member, and a bearing member formed of resilient material contained by said metal sleeve member and the flange portions thereof, said bearing member embracing at least a portion of said ball and defining a ball and socket joint therewith.

5. A fabricated torque rod comprising two identical elongated members respectively formed of relatively thin metal; each of said members having a flat surface, straight parallel sides and rounded ends, said flat surface having a continuous flange depending from its perimeter having an edge parallel with said flat surface, each of said flat surfaces having two circular openings formed therein respectively adjacent said ends, said edges of said flanges of said two members being welded together in abutting relationship with said flat surfaces in spaced parallel relationship and the openings adjacent each end of the flat surfaces respectively in alignment.

6. The combination of claim 5 wherein said rounded ends define 180° of a circle coaxial with the respective opening.

7. The combination of claim 5 wherein each of said openings is defined by a flange depending from the respective flat surface.

8. The combination of claim 5 wherein said rounded ends define 180° of a circle coaxial with the respective opening, wherein each of said openings is defined by a flange depending from the respective flat surface and substantially shorter than said continuous flange, and further comprising a pair of metal sleeve members respectively extending through said openings at each end of said flat surfaces and respectively engaging the flanges which define the same, the ends of said sleeve members being tack-welded to the respective flat surface at spaced locations; each of said metal sleeve members having another metal sleeve member press-fitted therein, a bushing of resilient material supported by said other sleeve member, and a bearing sleeve member supported by said bushing.

9. A fabricated torque rod comprising: two identical bearing assemblies; each of said bearing assemblies comprising two identical members respectively formed of relatively thin sheet metal, each of said members having a circular flat surface with a coaxial circular center opening formed therein and a continuous flange depending from its perimeter, said flange having an edge in a plane parallel with said flat surface, said edges of said flanges being welded together in abutting relationship with said flat surfaces in spaced parallel relationship and said openings in alignment; and an elongated tubular member formed of relatively thin sheet metal and having a rectangular cross-section joining said assemblies, said tubular member having flat top and bottom surfaces which are respectively co-planar with the respective flat surfaces of said bearing assembly members, said tubular member having flat side surfaces which are respectively tangent with said flanges of said bearing assemblies, the ends of said top and bottom surfaces of said tubular member respectively conforming to the curvature of said bearing assemblies and being welded thereto.

10. A fabricated torque rod comprising: two identical bearing assemblies; each of said bearing assemblies comprising two identical members respectively formed of relatively thin sheet metal, each of said members having a circular flat surface with a coaxial circular center opening formed therein and a continuous flange depending from its perimeter, said flange having an edge in a plane parallel with said flat surface, said edges of said flanges being welded together in abutting relationship with said flat surfaces in spaced parallel relationship and said openings in alignment; and an elongated member joining said bearing assemblies.

11. A fabricated torque rod comprising: two identical bearing assemblies; each of said bearing assemblies comprising two identical members respectively formed of relatively thin sheet metal, each of said members having a circular flat surface with a coaxial circular center opening formed therein and a continuous flange depending from its perimeter, said flange having an edge in a plane parallel with said flat surface, said edges of said flanges being welded together in abutting relationship with said flat surfaces in spaced parallel relationship and said openings in alignment; each of said bearing assemblies having a threaded stud welded to said flanges thereof and extending radially outwardly therefrom; and an elongated tubular member having means at its ends respectively in threaded engagement with said studs.

12. The combination of claim 4 wherein each of said openings is defined by a flange depending from the respective surface, said sleeve member engaging said last-named flanges, wherein one of the openings defined by said radially extending flanges is larger than the other, wherein said stud member extends through said larger opening, and wherein said bearing member has a coaxial opening extending therethrough smaller than either of said openings defined by said radially extending flanges, said coaxial opening embracing said stud member.

13. A fabricated torque rod comprising: two rod assemblies, each of said rod assemblies comprising two identical members respectively formed of relatively thin sheet metal; each of said members having a flat surface with a circular opening formed therein, a rounded end coaxial with said opening, straight parallel sides respectively tangent with said rounded end, and an opposite end, said flat surface having a flange depending from said sides and rounded end having an edge parallel with said flat surface; said edges of said flanges of said two members being welded together in abutting relationship with said flat surfaces in spaced parallel relationship and said openings respectively in alignment, said flanges and flat surfaces at said opposite ends thereof defining a tubular cross-section having an open end; and a tubular sleeve member telescoped partially within said open end of one of said assemblies and secured thereto with a portion projecting therefrom, said projecting portion being telescoped within the open end of the other of said assemblies and secured thereto.

14. A fabricated torque rod comprising: two bearing assemblies, each of said bearing assemblies comprising two identical members respectively formed of relatively thin sheet metal; each of said members having a flat surface with a circular opening formed therein, a rounded end coaxial with said opening, straight parallel sides respectively tangent with said rounded end, and an opposite end, said flat surface having a flange depending from said sides and rounded end and having an edge parallel with said flat surface, said edges of said flanges of said two members being welded together in abutting relationship with said flat surfaces in spaced parallel relationship and said openings respectively in alignment, said flanges and flat surfaces at said opposite ends thereof defining a tubular cross-section having an open end; an elongated hollow tubular intermediate member having open opposite ends; and tubular sleeve members respectively partially telescoped within said open ends of said intermediate member and respectively secured thereto, each of said sleeve members having a portion projecting from the respective end of said intermediate member, said projecting portions being respectively telescoped within said open ends of said bearing assemblies and respectively secured thereto.

References Cited in the file of this patent

UNITED STATES PATENTS

| 141,191 | Wilson | July 22, 1873 |
| 1,308,992 | Pribil | July 4, 1919 |
| 2,318,477 | Firth | May 4, 1943 |
| 2,642,318 | Ricks | June 16, 1953 |
| 2,827,303 | Herbenar | Mar. 18, 1958 |

FOREIGN PATENTS

| 12,118 | Great Britain | May 22, 1912 |